March 26, 1935.
L. G. JENNESS
1,995,353
PROCESS OF MAKING CATALYSTS
Filed Aug. 18, 1931
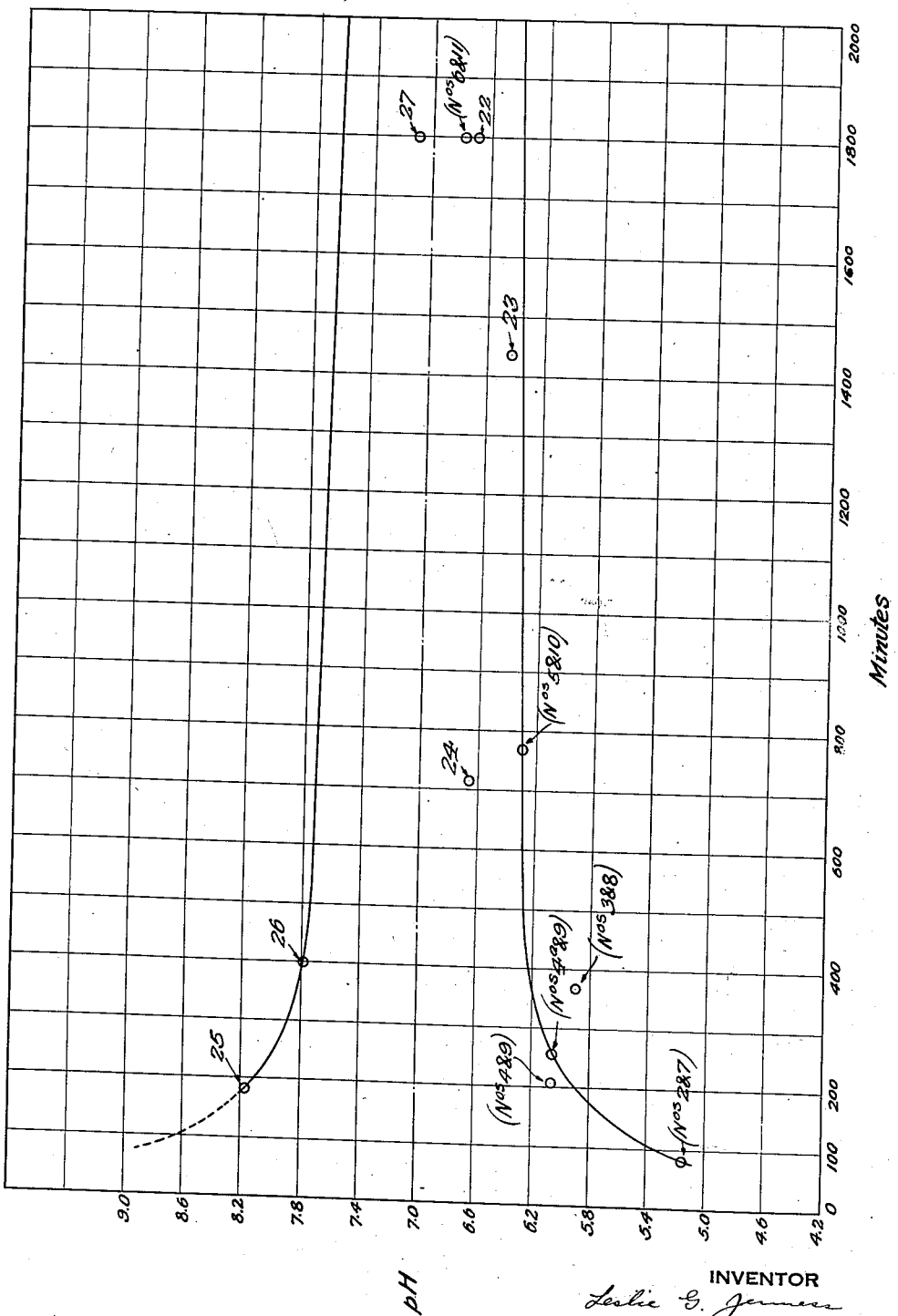

Patented Mar. 26, 1935

1,995,353

UNITED STATES PATENT OFFICE 1,995,353

PROCESS OF MAKING CATALYSTS

Leslie G. Jenness, Brooklyn, N. Y., assignor to Davis Emergency Equipment Company, Incorporated, New York, N. Y., a corporation of New York Application August 18, 1931, Serial No. 557,822

19 Claims. (Cl. 23—234)

The present invention relates generally to processes of preparing catalysts and more specifically to an improved method of precipitating substances for use as catalysts.

An object of the present invention is the production of catalysts possessing a high degree of catalytic activity capable of continuing, when in use, over considerable periods of time; and other objects are simplicity, reliability, and economy in the commercial manufacture of such catalysts.

Another object of the invention is to provide an improved process for the commercial manufacture of the oxidizing catalysts described and claimed in the copending application of J. M. Weiss, Serial No. 479,579, filed September 3, 1930.

For convenience hereinafter, the terms "activity" and "active" will be employed as referring to both of the following properties of a catalyst, to wit, (1) catalytic activity and (2) capability of the continuation of such activity when in use over long periods of time.

In general, a catalyst is prepared by precipitating the desired substance by reaction between the required reagents. The precipitated substance is thereafter treated in any appropriate manner to produce the desired material to be used as a catalyst. For example, the precipitated substance may be thoroughly washed, subjected to strong pressure, carefully dried at comparatively low temperatures, broken and sized, the resulting material being composed of porous agglomerates of small particles.

I have discovered the very important fact that the activity of a catalyst, prepared in a manner similar to that outlined above, is affected by the degree of acidity or by the degree of alkalinity of the medium, or solution of the combined reagents, within which precipitation takes place, and that the catalyst is impaired if said medium is either alkaline or acid in character, and is more active the nearer said medium is to a state of neutrality. The acidity or alkalinity of the medium may be due to one or more of the reagents being acids or alkalies or may be due to the presence of acid or alkaline substances in one or more of the reagents. The extent to which a catalyst may be impaired in certain cases by even slight degrees of acidity or alkalinity of the medium is indeed remarkable, and this appears to be the reason why the activity of a catalyst, as heretofore produced, cannot always be exactly reproduced.

Another way of expressing these discoveries is to state that the activity of a catalyst, originally produced by precipitation, increases the more nearly in pH value, or the negative logarithm of the hydrogen ion concentration, of the medium within which precipitation occurs, approaches the value 7, from either values smaller than 7 or values larger than 7. It should be noted that a solution having a pH of 7 is neutral, a solution having a pH less than 7 is acid, and a solution having a pH greater than 7 is alkaline.

I have also discovered that, by proper control of the pH of the medium within which precipitation occurs, the activity of a catalyst can be increased and in certain cases increased to a remarkably high degree and many times its usual activity when prepared in the ordinary manner.

In the aforesaid co-pending application of J. M. Weiss, oxidizing catalysts are described and claimed, which oxidizing catalysts consist of manganites of the heavy metals including copper, cerium, mercury, iron, nickel, tin, etc. These catalysts are prepared by precipitation and subsequent treatment as heretofore outlined. In that application there is also described a procedure wherein the activity of these catalysts is increased by dilution of the reagents involved in their precipitation. It is also stated that the apparent density of the precipitates, dried at 100° C., increases with increasing dilution, indicating changes in the physical structure of the catalysts, which are believed to be more porous the greater the dilution of the medium within which they are originally produced by precipitation.

I have ascertained that when the above mentioned oxidizing catalysts are prepared in accordance with the reactions described in that application, they are precipitated within a medium normally acid in character and the increase of their activity with increasing dilution of the medium is due fundamentally to a decrease of the acidity of the medium.

Increasing the dilution of the medium within which a catalyst is originally produced by precipitation, or of one or more of the reagents required to precipitate the desired substance, is, in effect, a control of the pH value of the medium, or a correction of the pH value of the medium to a value closer to the value corresponding to a neutral condition. This correction of the pH value of the medium by dilution is due not only to a decrease of the actual amount of acid or alkali present in the medium, but also to a dispersion of the acid or of the alkali in the medium. However, dilution, as a method of controlling or correcting the pH of the medium, possesses in some instances the disadvantage that so much larger quantities of liquid are necessary, that, if a catalyst of maximum activity is desired, the extremely large quantities of liquid which would have to be handled in the commercial manufacture of the catalyst are undesirable and, indeed, impracticable.

I have discovered that the pH value of the medium may be capably controlled by counteracting the acidity or alkalinity of the medium by a substance or substances in themselves alkaline or acid in character, the alkaline pH correcting substances functioning to control or correct the acidity of the medium and the acid pH correcting substances functioning to control or correct the alkalinity of the medium. If a catalyst of maximum activity is desired, a correction of the medium from either an alkaline or an acid condition, as the case may be, to a neutral or a substantially neutral condition is preferred, but a procedure which may be generally adopted is to correct the medium to a condition as close to a neutral condition as is made possible by the factors to be considered in the formation of the catalyst. This will be more thoroughly understood from the description hereinafter. The substance, after being precipitated in accordance with my method, may then be treated in any well known manner, as for example is outlined above, to produce the final catalytic material.

There are various ways in which my method of pH control may be carried out. A pH correcting substance, either acid or alkaline as the case may be, may be added to one or more of the reagents prior to combining them for precipitation of the desired substance for use as a catalyst, but in certain cases the addition of an acid pH correcting substance to one reagent and of a alkaline pH correcting substance to another reagent may be found best suited for the purpose, and in other cases it may be found preferable to run a pH correcting substance, either acid or alkaline as the case may be, with one or more of the reagents into the vessel in which precipitation takes place. It is understood that the present invention is not limited to the particular procedure employed which, in the manufacture of a particular catalyst, is, of course, left to the judgement of the operator, but the essential factor which should be borne in mind is that the effect on the final catalytic material of the condition or conditions of the medium resulting from its pH value is exerted while precipitation occurs in said medium and that the activity of the catalyst is at a maximum if it is precipitated from a solution maintained during precipitation at a pH of 7.

The increasing activity of a catalyst with decreasing acidity or decreasing alkalinity of the medium, or of the solution within which they are originally produced by precipitation, is believed to be not due to any chemical change in the catalyst itself. It is well known that the activity of any catalyst is dependent upon its physical structure and that its physical structure may be improved by diluting the medium within which it is originally produced by precipitation. I have discovered that the same effect may be produced by otherwise controlling the pH value of the medium. The present invention, therefore, applies generally to the formation of catalysts.

The present invention is hereinafter exemplified in connection with the production of acid manganite of copper, $Cu(HMnO_3)_2$, as an oxidizing catalyst, which catalyst is described and claimed in application Serial No. 479,579 as one possessing great activity. The general process employed for the precipitation of the aforesaid manganites of metals consists in reducing a permanganate by hydrogen peroxide in the presence of the metal selected for compounding with manganese, the reaction tending to produce both the acid manganite of the selected metal and the normal manganite of the selected metal. For example, potassium permanganate and a suitable soluble salt of copper may be treated with hydrogen peroxide, the reaction tending to produce both the acid manganite of copper, $Cu(HMnO_3)_2$, and the normal manganite of copper, $CuMnO_3$. The relative amounts of the two precipitated substances, to wit, acid manganite of the selected metal and normal manganite of the selected metal, are governed by the amount of the selected metal present during the reduction of the permanganate reagent by the hydrogen peroxide reagent, i. e., during the time the reagents are being admixed together. If an excess of the selected metal is present while reaction is taking place, then the normal manganite of the selected metal may be formed. For example, the addition of a solution of hydrogen peroxide to a solution of copper sulphate and potassium permanganate first allows the formation of the normal copper manganite, $CuMnO_3$ (this compound having an atomic ratio of copper to manganese of 1:1) even though the amounts of copper sulphate and potassium permanganate are adjusted to allow the presence of an atomic ratio of copper to manganese of 1:2 in the final mixture, the latter ratio being that of copper to manganese in the acid manganite of copper, $Cu(HMnO_3)_2$.

It is stated that it has been definitely established that acid manganite of copper is superior to manganite of copper in producing catalytic activity, and that there are strong indications that the acid manganites of all metals which may be used in association with manganese to produce the aforestated compounds are superior, respectively, to the manganites of these metals in producing catalytic activity.

In view of the superiority of the acid manganites of metals, there is adopted a preferred procedure permitting precipitation of the acid manganite of the associated metal as a single compound. In accordance with this preferred procedure, permanganate of potassium is reduced by hydrogen peroxide proportionally as the salt of the selected metal is added to the mixture of the reagents, i. e., the ions of the selected metal are allowed to be present in the medium, within which precipitation occurs, only in amount corresponding to the amount of permanganate reduced at any time. This may be accomplished by running a solution containing hydrogen peroxide and a soluble salt of the selected metal into a solution of potassium permanganate, all of the reagents being in exact theoretical amounts to yield the acid manganite of the selected metal. If it is desired to produce acid manganite of copper, and copper sulphate is the copper salt used, the reaction which takes place in accordance with this method of procedure is believed to be as follows:

$$CuSO_4 + 2KMnO_4 + 3H_2O_2 = Cu(HMnO_3)_2 + K_2SO_4 + 2H_2O + 3O_2$$

It is to be noted that it is essential that the solution of the salt of the selected metal and hydrogen peroxide should be added to the solution of potassium permanganate, if it is desired to precipitate acid manganite of the selected metal as a single compound. The addition of the solution of potassium permanganate to the solution of the salt of the selected metal and hydrogen peroxide, for instance, would not produce the desired result, as then there would be an excess of ions of the selected metal while reduction of potassium permanganate is taking place and formation of the normal manganite of the selected metal would necessarily follow. It is also to be noted that, in view of the fact that the hydrogen peroxide reagent is actually a water solution of hydrogen peroxide, the amount of this reagent necessary to reduce the potassium permanganate should first be determined by test, if the concentration of hydrogen peroxide is not accurately known.

The precipitated material, consisting of acid manganite or both acid manganite and normal manganite of the selected metal, is treated in any well known manner to produce the final catalytic material. For example, it is thoroughly washed and subjected to strong pressure such as in a screw press. The pressed wet material is then subjected to a drying process, usually at 130° C. It is then broken, sized, and the sized material is thereafter preferably dried at a higher temperature of, say, from 200° to 300° C. Preferably the drying of the material is carried out in oxygen or in a gas containing free oxygen.

Particular note shoulder be made of the stated fact that the activity of these oxidizing catalysts increase with decreasing concentration or increasing dilution of the reagents employed for their precipitation. For example, the activity of a catalyst, produced by the preferred method of procedure whereby acid manganite of the selected metal is precipitated as a single compound, increases with increasing dilution of the potassium permanganate solution into which the solution of hydrogen peroxide and salt of the selected metal is run, and the apparent density of the precipitate, dried at 100° C., also increases with increasing dilution of the potassium permanganate solution, indicating changes in the physical structure of the precipitate. It is stated that the increasing activity with increasing dilution of the reagents may be due to increased porosity of the final product.

The following detailed procedure is given for the production of an oxidizing catalyst consisting of acid manganite of copper:

Dissolve 66 grams of copper sulphate in such amount of water as to produce 1 gallon of copper sulphate solution, and dissolve 84 grams of potassium permanganate in such amount of water as to produce 1 gallon of potassium permanganate solution. The amount of a hydrogen peroxide solution of approximately 30% concentration required to reduce the potassium permanganate is determined by test, and in accordance with this test, the required amount say 180 cubic centimeters of this hydrogen peroxide solution, is admixed with the copper sulphate solution, no reaction taking place. The potassium permanganate solution is mixed with 44 gallons of water, and the solution of copper sulphate and hydrogen peroxide is introduced through a tube into the bottom of the tank holding the diluted potassium permanganate solution, the oxygen evolved during the reaction furnishing the required agitation to mix the reagents. The resulting precipitate, comprising acid manganite of copper, is removed by filtration and washed free of potassium sulphate. It is thereafter formed by pressure into a coherent mass, and the latter is dried at 130° C., broken and sized, and the sized material is further dried at 200° C.

In this detailed procedure, the concentration of the medium within which precipitation occurs, corresponds to .46 gram of final product per litre of combined reagents, and the apparent density of the precipitate, dried at 100° C., is stated to be .533. It is also stated that the final product, when tested against a carbon monoxide and air mixture containing 1% carbon monoxide, oxidizes the carbon monoxide with 100% efficiency for 12½ hrs. more or less.

Other examples are given in application Serial No. 479,579 to show the extent of increased activity with increasing dilution of the reagents, and are as follows:

An acid manganite of copper catalyst produced in a manner as described above, but with the potassium permanganate solution diluted to produce a concentration corresponding to 1.86 grams of final product per litre of the combined reagents, when tested in the same manner, is stated to oxidize the carbon monoxide with 100% efficiency for 6 hrs. and 10 minutes, and the apparent density of the precipitate, dried at 100° C., is stated to be .356. An acid manganite of copper catalyst also produced in a similar manner, but with a concentration of the reagents corresponding to 12.6 grams of final product per litre of the combined reagents, when tested in the same manner, is stated to oxidize the carbon monoxide with 100% efficiency for 1 hr. and 39 minutes.

To confirm the theory that the activity of an acid manganite of copper catalyst increases with dilution of the solution or medium within which it is precipitated, I prepared a catalyst consisting of acid manganite of copper, utilizing the procedure described in application Serial No. 579,479 and recited above and diluting the potassium permanganate solution to produce a concentration corresponding to .125 gram of final product per litre of combined reagents. This sample was thus produced from a solution of extreme dilution. It was prepared in sufficient quantity to allow the standard 10 c. m. test against a carbon monoxide and air mixture containing 1% carbon monoxide, and when so tested was found to be extremely active, failing to break down after 30 hrs. Here it should be observed, however, that the manufacture of this catalyst, utilizing this degree of dilution of the medium from which it is precipitated, would be difficult and uneconomical in view of the extremely large quantities of liquid necessary in its making. I also prepared other acid-manganite-of-copper catalysts by the same general procedure, utilizing various degrees of dilution of the potassium permanganate solution. The following table shows a summary of the results and includes the catalysts mentioned in application Serial No. 579,479. The catalysts are arranged numerically in the order of decreasing concentration of the medium within which precipitation occurs.

Table I

| Sample No. | Concentration of medium in grams of final catalyst per litre of combined reagents | Time of 100% activity against 1% carbon monoxide |
| --- | --- | --- |
| 1 | 12.6 | 1 hour 29 minutes. |
| 2 | 8.9 | 1 hour 20 minutes. |
| 3 | 1.86 | 6 hours 10 minutes. |
| 4 | .93 | 3 hours 30 minutes. |
| 4a | .93 | 4 hours 10 minutes. |
| 5 | .46 | 12 hours 49 minutes. |
| 6 | .125 | Greater than 30 hours. |

The increase of activity of the acid manganite of copper catalyst with increasing dilution of the medium is unquestionable, but it was apparent that there might be some other factor preventing continuity or uniformity in the increase of activity and an exact reproduction of results.

I recognized that hydrogen peroxide always carries a stabilizing substance, acid in nature, to prevent its decomposition on standing into water and oxygen. It was assumed, therefore, that this stabilizing substance might have had an influence on the solution from which the catalyst is precipitated, since the pH of this solution was necessarily altered by change of dilution, not only due to increasing dispersion of the stabilizing substance with increasing dilution, but also due to the following factor. The acid manganite of copper precipitated immediately acts in the solution as a catalytic agent in the decomposition of hydrogen peroxide, so that the greater the concentration of the solution utilized, the greater becomes the required amount of hydrogen peroxide and the greater becomes the amount of the acidic stabilizing substance present in the solution. Also, I recognized that a solution of potassium permanganate is alkaline in nature, its alkalinity increasing on standing, and that this would also have an effect on the pH of the solution.

With the above consideration in view, I prepared other acid manganite of copper catalysts, duplicating the concentrations used in the preparation of catalysts Nos. 2, 3, 4, 5 and 6 of Table I. The pH values of the solutions were measured, immediately after precipitation was complete, by a Leeds and Northrup potentiometer, using a quinhydrone electrode. The results of these measurements are shown in the following table:

Table II

| Sample No. | Concentration of medium in grams of final catalyst per litre of combined reagents | pH |
|---|---|---|
| 7 | 8.9 | 5.17 |
| 8 | 1.86 | 5.89 |
| 9 | .93 | 6.06 |
| 10 | .46 | 6.30 |
| 11 | .125 | 6.75 |

The latter table shows that acid manganite of copper is precipitated from a solution normally acid, that the pH value of the solution increases, or the acidity of the solution decreases, with its dilution, and that the increase in the pH value of the solution or the decrease in its acidity might readily account for the increased activity of the catalyst. It further shows that catalyst No. 6, possessing maximum activity, was prepared from a medium having a pH value close to the value 7 corresponding to a neutral condition, it being observed, however, that the pH measurements were made after precipitation occurred.

It may be generally stated that the manganites of the heavy metals, produced by the reactions described in application Serial No. 479,579, are precipitated from solutions normally acid.

To study the manner by which the pH of the medium might be controlled in a more practical manner than by dilution of the medium, I prepared a series of catalysts, using the same concentration of the medium as employed in the preparation of catalysts Nos. 3 and 8, and adding various amounts of acid and various amounts of ammonium hydroxide to the potassium permanganate solution prior to the addition thereto of the copper sulphate and hydrogen peroxide solution. Greater amounts of hydrogen peroxide were used in all cases where ammonium hydroxide was added to the potassium permanganate solution, in view of the possible effect of ammonium hydroxide as an alkali on the acidic stabilizing substance present in hydrogen peroxide at the time of the addition of the copper sulphate and hydrogen peroxide solution to the potassium permanganate solution. Immediately after each precipitation, the pH of the solution was measured, and the solution was thereafter tested to determine any copper and manganese salts, if present in solution. The following table shows the results obtained.

Table III

[Concentration of medium: 1.86 grams of final catalyst per litre of combined reagents]

| Sample No. | pH correcting substance per litre of combined reagents | Hydrogen peroxide per 11 litres of combined reagents | pH | Metal in solution after precipitation |
|---|---|---|---|---|
| | | cc. | | |
| 12 | 5 cc. sulphuric acid. | 53 | 1.56 | Cu and Mn |
| 13 | 2.5 cc sulphuric acid. | 53 | 1.77 | Cu and Mn |
| 14 | 5 cc. acetic acid | 53 | 4.04 | Cu and Mn |
| 15 | 2.5 cc. acetic acid | 53 | 3.77 | Cu and Mn |
| 16 | 1 cc. acetic acid | 53 | 4.62 | Cu and Mn |
| 17 | .5 cc. acetic acid | 63 | 5.50 | Mn. |
| 18 | .5 cc. ammonium hydroxide. | 63 | 9.14 | None |
| 19 | .18 cc. ammonium hydroxide. | 70 | 8.15 | None |
| 20 | .022 cc. ammonium hydroxide. | 65 | 6.38 | None |
| 21 | .027 cc. ammonium hydroxide. | 65 | 6.55 | None |
| 22 | .027 cc. ammonium hydroxide. | 60 | 6.70 | None |

It is seen from the latter table that the addition of a small amount of acid or alkali changes the pH of the medium very materially. It is observed that in the case of catalyst No. 22, a very small amount of alkali is required to produce a medium having a pH close to the value 7 corresponding to a neutral condition. It is also observed that the effect of hydrogen peroxide, or acidic stabilizing substance carried by same, on the pH of the medium, is clearly shown in the cases of catalysts Nos. 21 and 22 in the preparation of which the same small amount of alkali or ammonium hydroxide and different amounts of hydrogen peroxide were utilized. It is also of interest to observe that the copper is completely precipitated between a pH of 5.5 and 9.1 and that the manganese is completely precipitated between a pH of 6.4 and 9.1.

Sample No. 22 which was prepared from a solution close to neutral condition, after being treated to produce the final catalytic material, was tested in the standard way against 1% carbon monoxide. This sample was run for 30 hours without sign of breaking down and exhibited the same properties as catalyst No. 6, which was prepared from a solution of extreme dilution. Since the concentration for sample No. 22 was about 16 times as great as for sample Nos. 6 or 11, it is evident that it is primarily the pH value of the medium within which a catalyst is initially produced by precipitation which determines its activity, but that dilution is of little importance when the pH of the medium is kept under control, in accordance with my method, by a pH correcting substance.

By the same general procedure as employed in the preparation of former catalysts, I prepared another catalyst, sample No. 23, utilizing the following amounts of materials:

Potassium permanganate_____grams__ 420
Copper sulphate_____grams__ 330
Hydrogen peroxide (100 vol.)_____c.c.__ 770
Ammonium hydroxide_____c.c.__ 3.4
Water _____gallons__ 50

The pH of the resulting solution after precipitation was measured to be 6.42. This sample, after being thoroughly washed, pressed, dried, broken and sized, as in the usual manner, failed to show any sign of breaking down against 1% carbon monoxide, in the 10 c.m. tube test, during a period of 24 hours, the test being stopped after this period.

I prepared still another catalyst, sample No. 24, using the same concentration of solution as was used in the preparation of sample No. 2. The pH of the solution was corrected by the addition of ammonium hydroxide, the pH of the resulting solution after precipitation being 6.62. This sample, after being treated in the usual manner to produce the final catalytic material, showed the same properties as catalysts Nos. 6, 22 and 23, its test for activity being stopped after a 12 hour period. Since the concentration of the solution for the preparation of sample No. 24 was 5 times that of the solution for the preparation of sample No. 23 and 80 times that of the solution for the preparation of sample No. 6, it is very evident that pH control of the solution provides increased activity of the catalyst and that my method of pH control has the same effect as the use of extremely dilute solutions.

In the drawing there are illustrated two curves indicated respectively by the numerals 1 and 2. The lower curve 1 is a graph of the activity of the samples prepared from acid solutions as heretofore described and the activity of which was tested, against the pH values of the solutions during precipitation. The activity is measured by the time, in minutes, during which the catalyst acts with 100% efficiency in the standard 10 c.m. test against 1% carbon monoxide. Curve 2 will be explained hereinafter. It should be observed that in curve 1 the pH value corresponding to sample No. 7 is plotted against the activity of sample No. 2, the pH value corresponding to sample No. 8 against the activity of sample No. 3, the pH value corresponding to sample No. 9 against the activity of sample No. 4 and also against the activity of sample No. 4a, the pH value corresponding to sample No. 10 against the activity of sample No. 5, and the pH value corresponding to sample No. 11 against the activity of sample No. 6. This is because the actual pH values of the solutions used in the preparation of sample Nos. 2, 3, 4, 4a, 5 and 6 were never measured, their degrees of dilution, however, being the same as those corresponding respectively to sample Nos. 7, 8, 9, 10 and 11, the pH values of which were measured. This accounts for the discrepancies of some of these plotted points. As stated heretofore, the alkalinity of the potassium permanganate solution increases on standing. It is believed that this took place in the preparation of sample No. 3, so that the pH of the solution from which it was precipitated would be larger than that utilized in the plotting of the point corresponding to sample Nos. 3 and 8, accounting for the large departure of this plotted point from the curve. It should also be observed that the activity of sample Nos. 6, 22, 23 and 24, prepared from solutions close to a neutral condition, is much greater than that plotted, tests for their activity having been stopped after the periods of time indicated. It is seen that the activity of the acid manganite of copper catalyst increases only slowly with an increase in pH from 5 to 6, but very rapidly above a pH of 6. The range in pH where the activity of this catalyst is known to be great is between 6.42 and 6.75, and it is evident that the greatest activity is at a pH of 7, a perfectly neutral solution.

It now becomes apparent that I have provided a much improved process of producing a catalyst possessing great activity, in that such catalyst may be produced by precipitation from more concentrated solutions. There are factors which must be considered in its operation. For example, in the production of a catalyst containing a manganite of a heavy metal, the greater the concentration of the solution within which precipitation occurs, the greater the amount of hydrogen peroxide is required due to the precipitate acting as a catalytic agent in the decomposition of hydrogen peroxide. This increased consumption of hydrogen peroxide with increasing concentration of the solution implies more ammonium hydroxide or other alkali as a pH controlling substance, the more the amount of hydrogen peroxide is required, and the more the amount of alkali required, the greater its neutralizing effect on the acidic stabilizing substance present in hydrogen peroxide, necessitating a still greater amount of hydrogen peroxide. These factors, in the manufacture of a catalyst, consisting of a manganite of a heavy metal, limit the pH value to which the solution may be corrected. Consequently there should be maintained an economic balance wherein the degree of concentration of the solution and its pH value are so adjusted as to produce the desired degree of activity of the catalyst. A value of pH which has been found satisfactory for operation, when working with solution concentrations less than or not greatly exceeding in order of magnitude that which was used in the preparation of catalyst No. 2 or catalyst No. 24, is at about 6.7, it being remembered that this pH value is that of the solution after precipitation.

I have found that other alkalies, such as sodium hydroxide or sodium carbonate, can be employed to correct the acidity of the solution during precipitation. Ammonium hydroxide was selected in the above examples because it is a weak alkali and therefore aids in the pH control.

It will now be demonstrated that the activity of a catalyst is also affected if precipitated from an alkaline solution or one having a pH value greater than 7. I prepared several acid manganite of copper catalysts, sample Nos. 25, 26 and 27, by the same general procedure as heretofore described, utilizing the same concentration of solution as that used for the preparation of sample Nos. 3, 8, and 12 to 22 inclusive, but adding ammonium hydroxide to the potassium permanganate solution in such varied amounts as to cause the resulting solution during precipitation to possess various degrees of alkalinity. In curve 2 of the drawing, the activity of these samples, Nos. 25, 26 and 27, is plotted against the pH of the solution measured after precipitation, and, as in curve 1, the activity is measured by the life of the catalyst or the period, in minutes, during which it acts with 100% efficiency in the standard test against carbon monoxide. It should be noted that the activity of sample No. 27 is greater than that plotted, the test for the activity having been stopped after a run of 30 hours without breakdown. The results plotted clearly show that alkalinity of the medium during precipitation, as well as acidity, has an effect on the activity of a catalyst. They further show that the pH of the medium may be advantageously controlled, when said medium is normally alkaline, to produce a catalyst of desired activity. The concentration of the solution used in the preparation of sample No. 27, which evinced a very large activity, was about 16 times as great as that of the extremely diluted solution used in the preparation of sample No. 6, this showing that a catalyst of large activity may be produced in accordance with my method of pH control from a concentrated normally alkaline solution. It is observed that curve No. 2 for the alkaline solutions is practically symmetrical to curve No. 1 for acid solutions. This shows very clearly that the ideal condition is to precipitate a catalyst from a solution maintained at a pH of 7. It is also observed that an acid manganite of copper catalyst of very good activity can be obtained when the pH of the solution is controlled between 6.5 and 7.5.

Since activity of a catalyst is affected by alkalinity of the solution during precipitation, the increase of the alkalinity of the potassium permanganate solution on standing is a factor to be considered in the manufacture of a catalyst consisting of a manganite of a heavy metal.

It is to be particularly noted that, in the preparation of any catalyst, it is the control of the pH of the solution at the moment of precipitation and during precipitation which is essential in providing a catalyst of maximum activity. In certain cases pH measurements of the solution during precipitation are not practicable and this is true in the production of a catalyst consisting of a manganite of a heavy metal, because of the difficulty in determining the pH of solutions containing hydrogen peroxide. Therefore, as has been noted, the control of the hydrogen ion concentration of the solution during precipitation has been obtained, in the preparation of the samples formerly described, by measuring the pH of the solution after precipitation was complete. However, the degrees of solution concentration used in the preparation of said samples were not such as to effect any material change in the pH of the solution from the time precipitation began to the time precipitation was complete.

A procedure which may be followed whereby my method of precipitation may be carried out in the commercial production of an acid manganite of copper catalyst possessing a high degree of activity, is the following:

The following solutions are prepared:

Solution 1

330 grams (.728 lb.) of copper sulphate of the formula $CuSO_4.5H_2O$ 770 c.c. of hydrogen peroxide (100 volume)

5 gallons of water

Solution 2

420 grams (.928 lb.) of potassium permanganate 45 gallons of water

The required amount of ammonium hydroxide or other pH correcting substance is determined by test. This test may consist in forming a sample solution of copper sulphate and hydrogen peroxide having the same concentration as that of Solution No. 1 and a sample solution of potassium permanganate having the same concentration as that of Solution No. 2, the reagents being in calculated amounts to precipitate acid manganite of copper. A small amount of ammonium hydroxide is added to the sample solution of potassium permanganate, and the sample solution containing copper sulphate and hydrogen peroxide is added to the sample solution containing potassium permanganate and ammonium hydroxide, the resulting solution after precipitation being measured for its pH value. This is repeated with varying amounts of ammonium hydroxide until the pH measurements show that the resulting solution after precipitation has a pH value of about 6.7 and that the latter value can be reproduced by successive treatments. The required amount of ammonium hydroxide, determined by test, is added to Solution No. 2, and Solution No. 1 is then allowed to run into Solution No. 2, preferably through a pipe leading to the bottom of the vessel containing Solution No. 2 so that the evolution of oxygen during precipitation is utilized for mixing the two solutions together. However, other means of mixing may also be utilized. The resulting product is then passed through a plate and frame filter press, washed with water, pressed, dried and sized to 10 to 14 mesh.

It should be noted that the time required to remove the soluble potassium sulphate by washing depends upon the degree of concentration of the solution utilized during precipitation. For the particular procedure described, it has been found that about 3 hours are necessary to eliminate the soluble sulphate to a minimum, although this time is undoubtedly somewhat greater if more concentrated solutions are utilized.

If it is desired to produce catalysts, consisting of maganites of the heavy metals, from very much more concentrated solutions, say from solutions 10 to 20 times as concentrated as that employed in the above mentioned procedure, the change in the pH of the solution during precipitation would be a factor to be considered. Under these conditions a very much greater amount of ammonium hydroxide or alkaline pH correcting substance is required, and if, for example, a correcting substance is added to a potassium permanganate solution before combining the latter with a solution of hydrogen peroxide and of a salt of the metal selected for compounding with manganese, the resulting solution is quite strongly alkaline at the start of precipitation. Although the final solution, after precipitation is complete, may be around 6.7, the pH of the solution during precipitation will vary from a very much higher pH value (greater than 7) down to 6.7. Such a procedure will evidently result in a catalyst possessing less activity.

Another factor which must be considered when working with more concentrated solutions, in the production of catalysts consisting of manganites of the heavy metals, is the fact that hydrogen peroxide has a tendency to decompose, its rate of decomposition being catalyzed by hydroxyl ions and by metallic ions such as Cu and Mn or $MnO_4$. The greater the extent of this decomposition, the greater is the loss in efficiency in the reduction of the permanganate reagent. More hydrogen peroxide is then required and this, in turn, requires the use of more ammonium hydroxide.

A procedure which may be followed for the production of catalysts, consisting of maganites of the heavy metals, from more concentrated solutions, consists in adding ammonium hydroxide or other alkaline pH correcting substance to the hydrogen peroxide reagent prior to combining the reagents together. For example, three solutions may be prepared, one of the salt of the selected metal, another of hydrogen peroxide and ammonium hydroxide, and the third of potassium permanganate corrected to a pH of 7. The first two solutions are run into the third. Preferably, in order to precipitate the acid manganite of the selected metal as a single compound, the first two solutions are run into the third in such regulated amounts that the copper will be present during precipitation in amounts corresponding to the amount of reduction of the permanganate at any time. Another procedure which may be employed consists in running the alkaline pH correcting substance in a separate stream, i. e., independently of the other reagents and in regulated amounts into the vessel into which precipitation takes place. For example, ammonium hydroxide, hydrogen peroxide, and a copper sulphate solution may each be added separately and in regulated amounts to a potassium permanganate solution, the reaction producing acid manganite of copper as a precipitate.

What is claimed is:

1. In a process of producing a catalytic material containing a manganite of a metal the oxide of which does not exert an alkaline reaction when added to water, the step of precipitating the material from a concentrated solution normally non-neutral but brought closer to a neutral condition by a substance which is in addition to the precipitating agent or agents and does not prevent the precipitation.

2. In a process of producing a catalyst containing a manganite of a heavy metal, precipitating a manganite of a heavy metal within a concentrated medium normally non-neutral but adjusted to a condition closer to neutrality by a substance which is in addition to the precipitating agent or agents and does not prevent the precipitation.

3. In a process of producing a catalyst containing a manganite of a metal of the iron group, precipitating a manganite of a metal of the iron group within a concentrated medium having its pH normally different from 7 but adjusted to a value closer to 7 by a substance which is in addition to the precipitating agent or agents and does not prevent the precipitation.

4. In a process of producing a catalyst containing a manganite of copper, precipitating a manganite of copper from a concentrated medium normally non-neutral but brought closer to neutrality by a substance which is in addition to the precipitating agent or agents and does not prevent the precipitation.

5. In a process of producing a catalyst containing an acid manganite of copper, precipitating acid manganite of copper from a concentrated solution normally non-neutral but brought closer to neutrality by a substance which is in addition to the precipitating agent or agents and does not prevent the precipitation.

6. In a process of producing a catalyst containing a manganite of a heavy metal, precipitating said manganite of a heavy metal in a concentrated medium formed by treating a permanganate with hydrogen peroxide in the presence of said metal, said medium having its pH normally different from 7 but adjusted to a value closer to 7 by a substance which is in addition to the precipitating agent or agents and does not prevent the precipitation.

7. In a process of producing a catalyst containing acid manganite of copper, treating potassium permanganate with hydrogen peroxide in the presence of a soluble salt of copper, the medium within which said precipitation occurs having its pH adjusted to about 7 by a substance which is in addition to the precipitating agent or agents and does not prevent the precipitation.

8. In a process of producing a catalyst containing a manganite of a heavy metal, in which process said manganite of a heavy metal is precipitated in a normally acid medium formed by treating a permanganate with hydrogen peroxide in the presence of the heavy metal, the step consisting in adjusting the pH of said medium to a value close to 7 by an alkaline substance which is in addition to the precipitating agent or agents and does not prevent the precipitation.

9. In a process of producing a catalyst consisting of acid manganite of copper, in which said acid manganite of copper is precipitated in a normally acid medium formed by reduction of potassium permanganate by hydrogen peroxide in the presence of a soluble salt of copper, the step consisting in adjusting the pH of the medium to a value close to 7 by an alkaline substance which is in addition to the precipitating agent or agents and does not prevent the precipitation.

10. The process of producing a catalyst consisting in precipitating acid manganite of copper from a concentrated normally acid medium formed by treating potassium permanganate with hydrogen peroxide and a soluble salt of copper and adjusting the pH of said medium to a value closer to 7 by an alkaline substance which is in addition to the precipitating agent or agents and does not prevent the precipitation.

11. The process of producing a catalyst consisting in precipitating acid manganite of copper from a normally acid medium formed by adding a solution of hydrogen peroxide and a solution of copper sulphate to a solution of potassium permanganate and adjusting the pH of said medium to a value closer to 7 by an alkaline substance which is in addition to the precipitating agent or agents and does not prevent the precipitation.

12. A process of producing a catalyst consisting in precipitating acid manganite of copper in a medium formed by adding a solution of hydrogen peroxide and a solution of a salt of copper to a solution of potassium permanganate containing an alkaline substance which is in addition to the precipitating agent or agents and does not prevent the precipitation and which corrects the pH of said medium to a value closer to 7.

13. A process of producing a catalyst consisting in precipitating acid manganite of copper from a medium formed by adding a solution of hydrogen peroxide and a solution of copper sulphate to a solution of potassium permanganate containing an alkaline substance which is in addition to the precipitating agent or agents and does not prevent the precipitation and which brings the medium to a condition close to neutrality, said medium having a concentration of the order corresponding to two grams of final product per liter of combined reagents.

14. In a process of producing a catalyst, precipitating acid manganite of copper by adding, to a potassium permanganate solution, hydrogen peroxide, a solution of a soluble salt of copper and an alkaline substance which is in addition to the precipitating agent or agents and does not prevent the precipitation and which corrects the pH of the medium within which the precipitation occurs closer to the value 7.

15. In a process of producing a catalyst, precipitating acid manganite of copper by adding, to a potassium permanganate solution having a pH of 7, a solution of hydrogen peroxide, a solution of a soluble salt of copper, and a solution of an alkaline substance which is in addition to the precipitating agent or agents and does not prevent the precipitation and which brings the medium within which the precipitation occurs closer to neutrality.

16. In a process of producing a catalyst, precipitating a manganite of a heavy metal in a concentrated medium formed by treating a permanganate with hydrogen peroxide in the presence of a heavy metal and simultaneously but separately adding in regulated amounts to said medium an alkaline substance which is in addition to the precipitating agent or agents and does not prevent the precipitation and which adjusts the pH of said medium to a value close to 7 during the period of the precipitation.

17. In a process of producing a catalyst, in which process a manganite of a heavy metal is precipitated by treating a permanganate with hydrogen peroxide in the presence of the heavy metal, the step consisting in adding to the hydrogen peroxide reagent, prior to combining the reagents together an alkaline substance which is in addition to the precipitating agent or agents and does not prevent the precipitation and which corrects the pH of the medium within which the precipitation occurs to a value closer to 7.

18. In a process of producing a catalyst, precipitating a manganite of a heavy metal by adding to a potassium permanganate solution in separate streams and in regulated amounts, a solution of hydrogen peroxide, a solution of a salt of the heavy metal and a solution of an alkaline substance which is in addition to the precipitating agent or agents and does not prevent the precipitation and which brings the medium within which the precipitation occurs close to neutrality during the precipitation.

19. In a process of producing a catalyst, in which process a manganite of a heavy metal is precipitated in a medium formed by adding hydrogen peroxide and a solution of a salt of the heavy metal to a potassium permanganate solution, the step consisting in adjusting the pH of the potassium permanganate solution to about 7 prior to adding the other reagents thereto by an acid substance which is in addition to the precipitating agent or agents and does not prevent eventual precipitation, and adjusting the pH of said medium to about 7 during precipitation by an alkaline substance which is in addition to the precipitating agent or agents and does not prevent the precipitation.

LESLIE G. JENNESS.